J. W. NILSSON.
DETECTOR FOR PARTY LINE TELEPHONES.
APPLICATION FILED APR. 11, 1912.
1,053,430.
Patented Feb. 18, 1913.
5 SHEETS—SHEET 1.
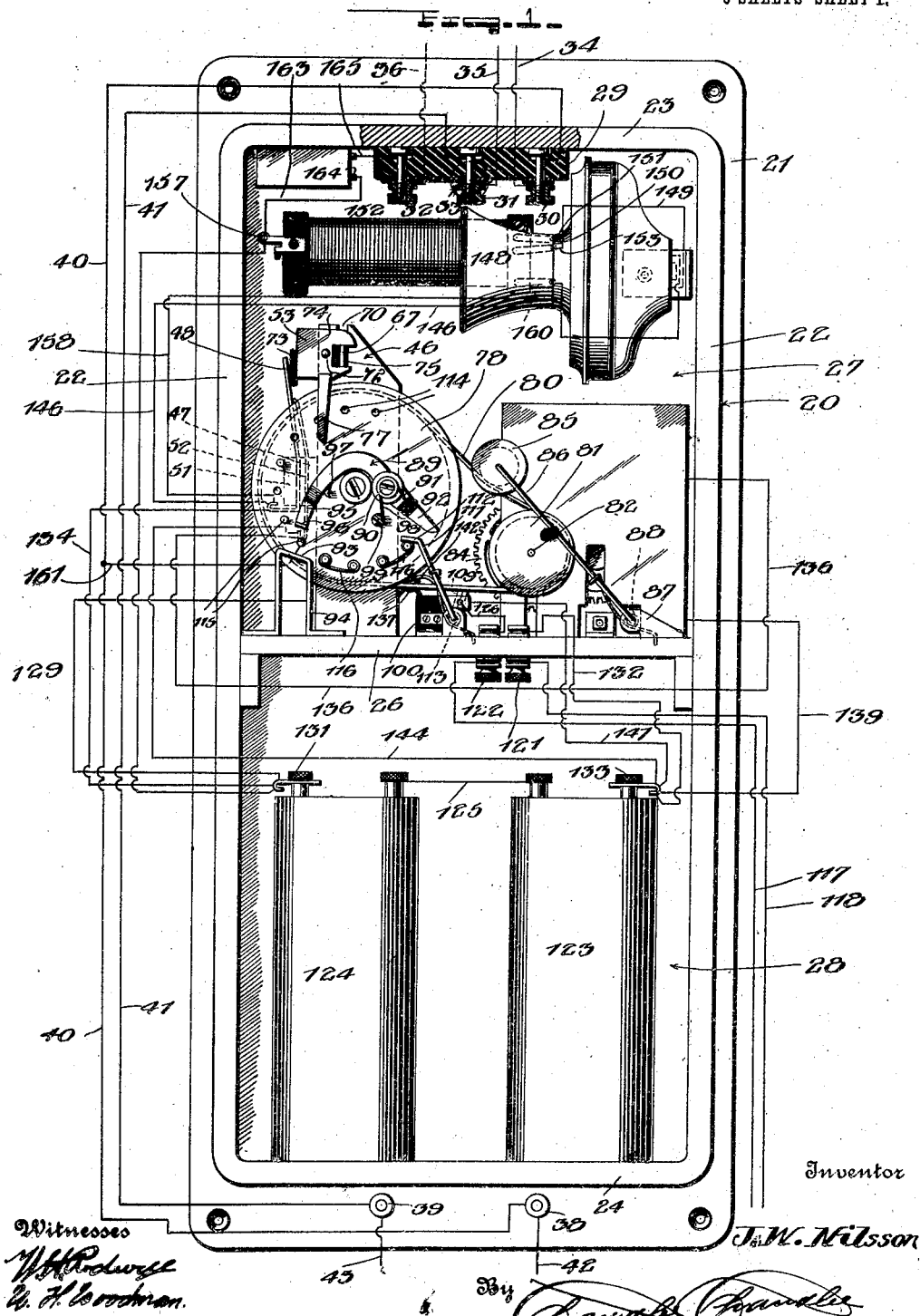
Witnesses
Inventor
J. W. Nilsson
By
Attorneys

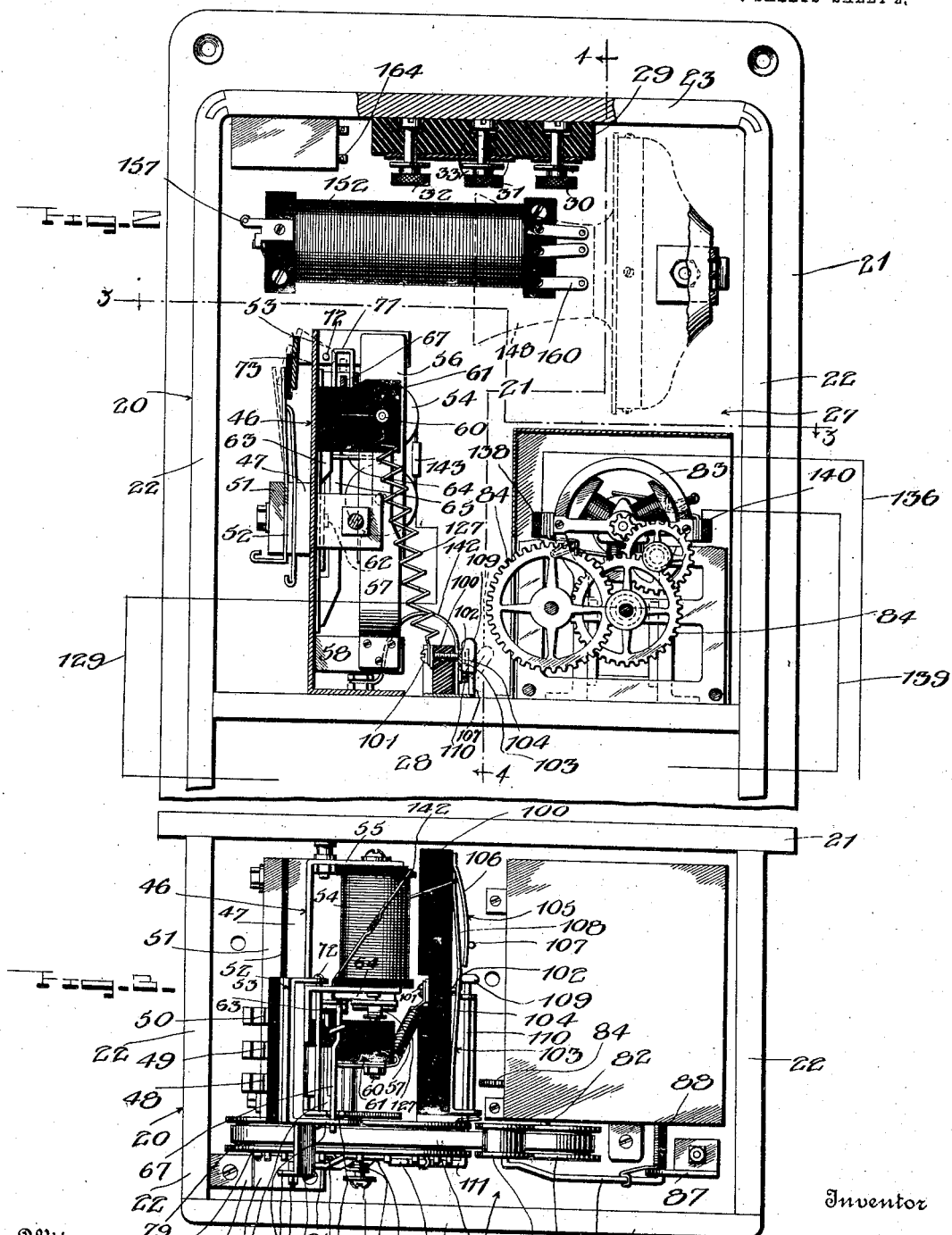

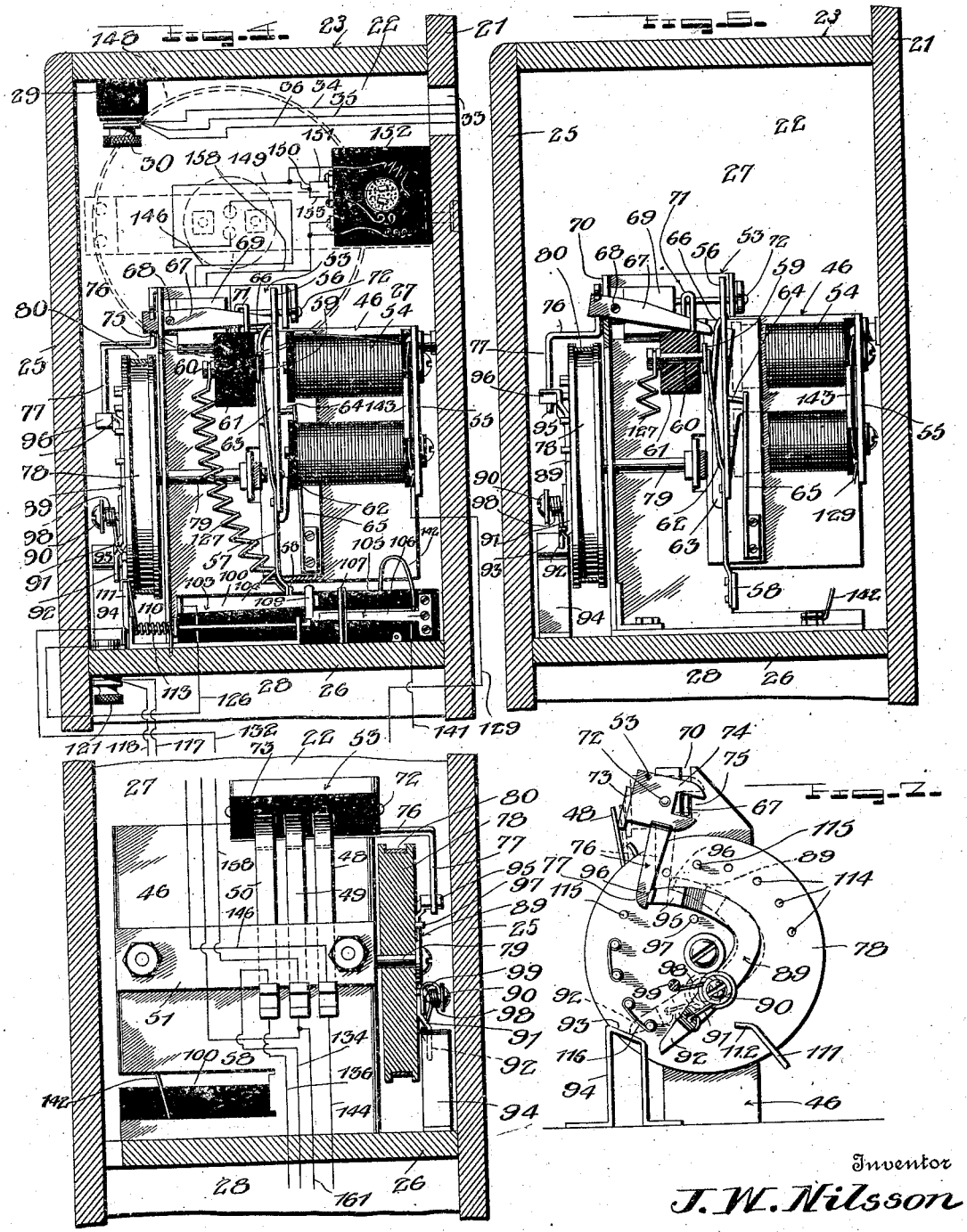

J. W. NILSSON.
DETECTOR FOR PARTY LINE TELEPHONES.
APPLICATION FILED APR. 11, 1912.
1,053,430.
Patented Feb. 18, 1913.
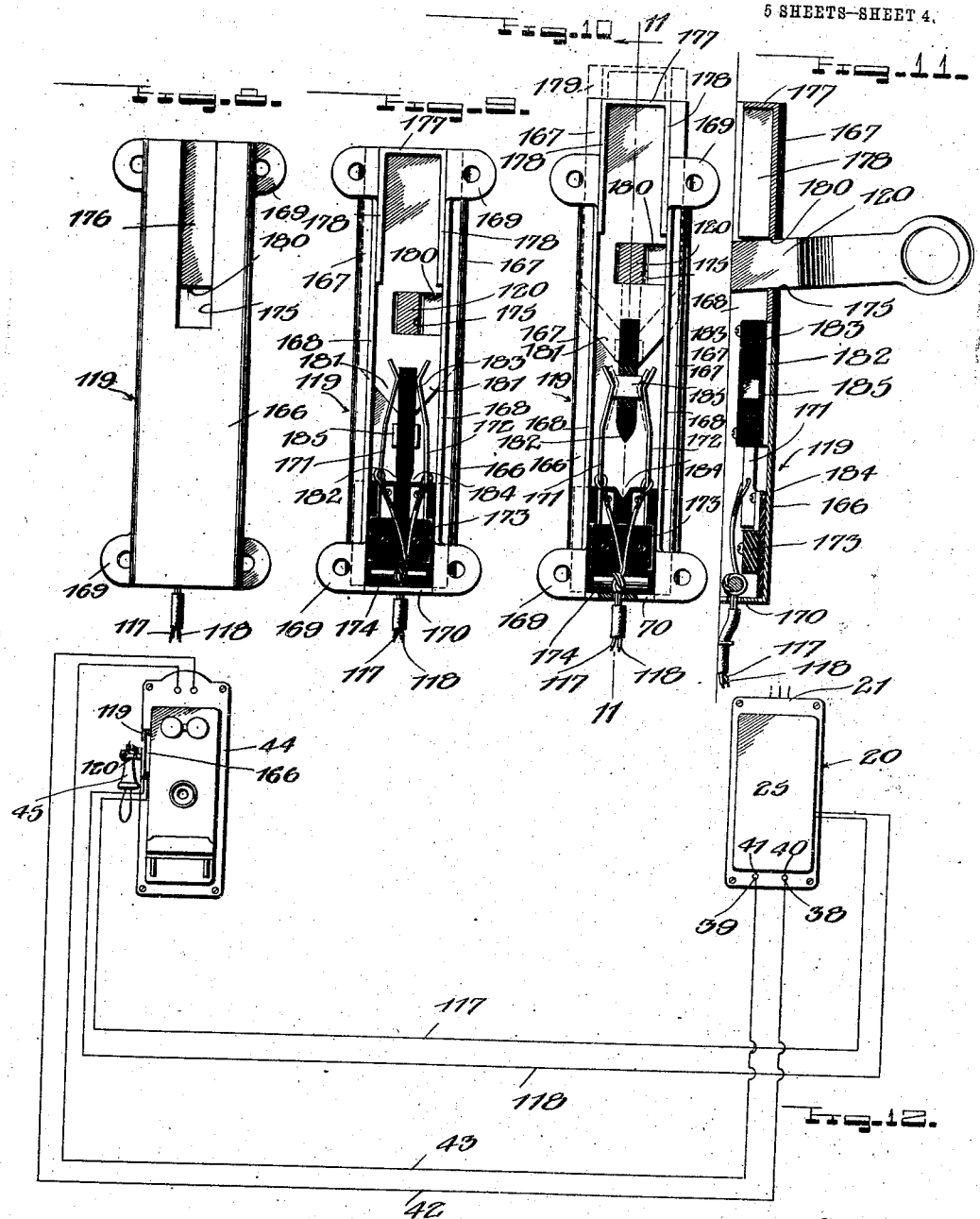

J. W. NILSSON.
DETECTOR FOR PARTY LINE TELEPHONES.
APPLICATION FILED APR. 11, 1912.
1,053,430.
Patented Feb. 18, 1913.
5 SHEETS—SHEET 5.
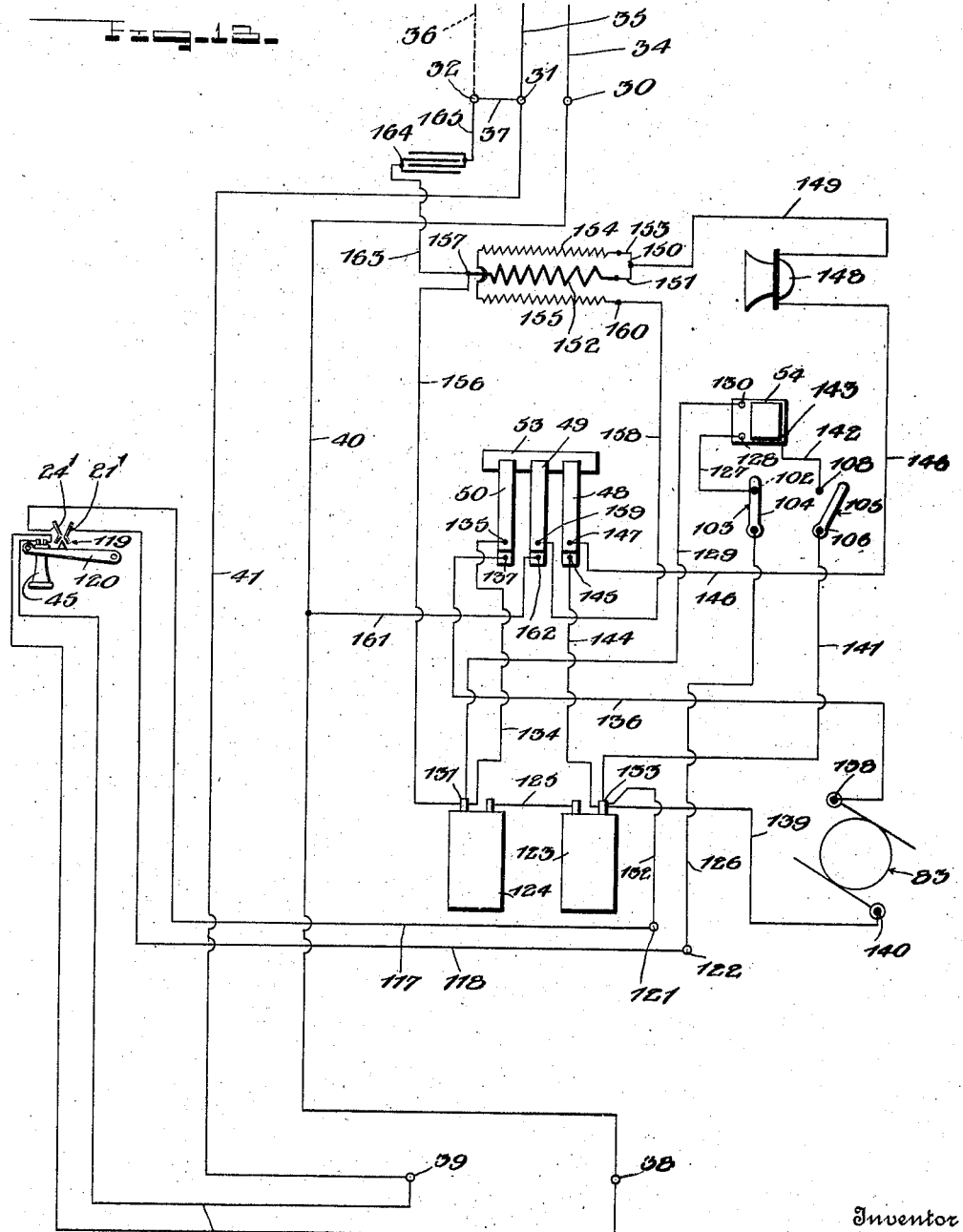
Witnesses
W. H. Rockwell
U. H. Woodman.
Inventor
J. W. Nilsson
By Banabo Banabo
Attorneys

UNITED STATES PATENT OFFICE.

JOHN W. NILSSON, OF BALFOUR, NORTH DAKOTA.

DETECTOR FOR PARTY-LINE TELEPHONES.

1,053,430.  Specification of Letters Patent.  Patented Feb. 18, 1913.

Application filed April 11, 1912. Serial No. 690,027.

*To all whom it may concern:*

Be it known that I, JOHN W. NILSSON, a citizen of the United States, residing at Balfour, in the county of McHenry, State of North Dakota, have invented certain new and useful Improvements in Detectors for Party-Line Telephones; and I do hereby declare the following to be a full, clear, and exact description of the invention, such as will enable others skilled in the art to which it appertains to make and use the same.

My invention relates to new and useful improvements in detectors for party line telephones and the object of my invention is to improve the construction and improve the efficiency of devices of the above described character.

A further object of my invention is to provide a detector which may be positioned at a distance from the telephone and which will be set in operation by the momentary closing of a circuit caused by the movement of the receiver arm of the instrument and which will then continue through its complete cycle of operation as a structure absolutely independent and distinct from the telephone itself.

A further object of my invention is to provide a detector which will not only give warning upon the "cutting-in" of a third person upon the line but will also indicate when the person so "cutting-in" has "hung up." Thus showing whether the "cutting-in" was intentional, this being determined by means of the lapse of time between the first signal and the last.

A further object of my invention is to provide an instrument in which the signal given shall be the "call ring" of the instrument which is "cutting-in." And a still further object of my invention is to provide an instrument of the character described, so constructed that if the same "station" cut in repeatedly or if a number of "stations" "cut in" successively the instrument will in each and every case give the proper warning signal.

With these and other objects in view, my invention will be more fully described, illustrated in the accompanying drawings which show a preferred embodiment of my device and then specifically pointed out in the claims which are attached to and form a part of this application.

In drawings:—Figure 1 is a front elevation of my improved detector with the face plate or cover of the casing removed to show the position of the various pairs. Fig. 2 is a similar view of the operating mechanism, portions being broken away to more clearly show the remaining structure. Fig. 3 is a section on the line 3—3 of Fig. 2 giving a top plan view of the operating mechanism. Fig. 4 is a section on the line 4—4 of Fig. 2 showing the circuit breaking mechanism in normal position, the circuits being open. Fig. 5 is a similar view showing the position of the parts when the circuits are closed. Fig. 6 is a side elevation showing the wiring of the circuits, said figure being partially in section and showing the bell ringing mechanism. Fig. 7 is a fragmentary detail of the bell ringing mechanism together with the circuit breaking mechanism, the parts being shown in front elevation. Fig. 8 is a front elevation of the circuit closing switch which is attached to the telephone instrument proper, to set my detector in motion upon the movement of the receiver holding arm. Fig. 9 is a rear elevation of the same in normal position. Fig. 10 is a similar view showing the receiver arm partially raised, the circuit being closed, the position of the parts when the arm is fully raised being shown in dotted lines. Fig. 11 is a longitudinal section on the line 11—11 of Fig. 10. Fig. 12 is a diagrammatic view showing the wiring between each telephone instrument proper and my detector. Fig. 13 is a diagrammatic view of the wiring of my detector.

Referring more specifically to the drawings in which similar reference numerals designate corresponding parts throughout, 20 designates my improved detector as a whole which, as best shown in Fig. 1, is positioned in a suitable casing comprising a back member 21 adapted for attachment to a wall or other suitable support, preferably at a point adjacent the point of entry of the line wires into the house, side walls 22, a top wall 23 a bottom wall 24 and a cover or face plate 25. This casing is provided intermediate its length with a transversely extending partition wall 26 forming an upper compartment 27 in which is positioned the operating mechanism of the instrument and a lower compartment 28 in which the batteries for energizing and operating the mechanism are positioned.

Secured to the forward portion of the lower face of the top wall 23 is a block 29 provided with spaced binding posts 30, 31 and 32. The telephone wires are drawn in through a suitable aperture 33 formed in the back wall of the casing and are connected to these binding posts as shown, the line wire 34 being connected to the binding post 30 while the ground wire 35 is connected to the binding post 31. If necessary a second ground wire shown in dotted lines at 36 may be connected to the binding post 32, if not, the binding posts 31 and 32 are connected by a cross wire 37. The lower portion of the back wall 21 of the casing is provided with a pair of spaced binding posts 38 and 39 which as shown are preferably positioned outside of the casing proper. A conductor wire 40 connects the binding post 30 with the binding post 38 while a conductor wire 41 connects the binding post 31 with the binding post 39. Conductor wires 42 and 43 connect the binding posts 38 and 39 respectively, with the corresponding binding posts of the telephone instrument proper, which, as shown in Fig. 12, is designated as a whole by the numeral 44. In Fig. 13 for the sake of clearness and simplicity I have shown these wires connected directly to the binding posts of the receiver 45.

A suitable supporting frame 46 preferably formed of relatively heavy sheet metal is secured to the upper face of the partition wall 26. Secured to the outer face of this frame and extending transversely across the same is a block 47 of vulcanized rubber or other suitable insulating material and carried by this block are vertically extending circuit breakers 48, 49 and 50. Each of these circuit breakers comprises an inner and an outer member both formed of spring metal and secured in parallel spaced relation to the block 47 by a block 51 which is clamped against the outer faces of the outer members of the circuit breakers, which are clamped against the outer face of an insulated spacer strip 52 which is positioned between the inner and outer members and which in turn clamps the inner members against the block 47. The inner members of the circuit breakers are considerably shorter than the outer members as best shown in Fig. 2 and have their upper ends directed outwardly to contact with the outer members which latter however, are normally held out of engagement with the inner members by a pivoted catch mechanism designated as a whole by the numeral 53, which catch mechanism will be hereinafter more fully described. As a means for operating these circuit breakers I have provided an electro-magnet 54 which is secured to an inwardly directed extension 55 of the frame 46 and which, when energized, attracts an armature 56 which extends across the poles of the magnet and which is secured by its lower end to the central portion of a vertically directed spring 57 the lower end of which is secured to an inwardly directed extension 58 of the frame 46 the free end of said spring extending upwardly as shown to engage against a contact plate 59 which is in fact, the head of a binding post 60 carried by a block 61 of non-conductive material which is in turn, secured to the inner face of the frame 46.

Pivotally mounted adjacent its lower end upon a pin 62 carried by the frame 46 is a lever 63 provided intermediate its length with a lateral extension 64 which projects between the arms of the magnet and bears against the armature 56 to normally hold the same from engagement with the magnet, the lever 63 being maintained in advanced position by means of a suitable leaf spring 65 which bears against the extension 64 of the lever. The forward upper portion of this lever is provided with a laterally directed extension 66 which is arcuate in shape to form a bearing face for the inner end of a trip lever 67 which is pivoted at 68 to a bracket 69 carried by the frame, the other end of said trip lever extending through a longitudinal slot formed in the forward face of the frame as shown at 70. Extending upwardly from the block 61 is a guide 71 through which the inner end of the trip lever is passed, said guide preventing all movement of the trip lever other than in a vertical plane.

The catch mechanism which has been previously designated as a whole by the numeral 53 comprises a U-shaped strip of sheet metal which is pivotally mounted upon the frame by means of a pivot pin 72 which extends through the end portions of said strip and through the frame 46. The outer members of the circuit breakers 48, 49 and 50 bear against a strip of non-conductive material 73 carried by the bight portion of the catch member. As best shown in Fig. 7 of the drawings one of the end portions 74 of this strip is extended beyond its pivot point and is cut away to form a parallel faced recess 75 into which extends the end 70 of the trip lever 67, this recess being so proportioned with respect to the trip lever that the swinging of the lever upon its pivot will swing the catch upon the pivot pin 72 and conversely the swinging of the catch will swing the trip lever. This recessed end 74 of the catch mechanism is provided with a forwardly directed arm 76 having a downwardly directed terminal 77 which extends in parallel spaced relation over the face of a disk 78 which is revolubly mounted upon a shaft 79 carried by the frame 46. This disk 78 has its peripheral face grooved to receive a belt 80 which passes about the disk and about a pulley 81 keyed upon a shaft 82 which is driven by a small electric motor 83 through a train of reduction gears shown at 84 the driving belt 80 being properly tensioned by means of an idler 85 carried by the free end of a rod 86 the other end of which is swingingly mounted in a bracket 87 carried by the partition 26, the idler being held in engagement with the belt by means of a helical spring 88 which surrounds the pivot pin of the rod 86 and is secured by one end to the partition wall 26 and has its opposite end extended along the rod 86 and secured thereto.

An L-shaped setting lever for the catch 53, designated as a whole by the numeral 89 is pivotally mounted upon the outer face of the disk 78 by a pin 90 which passes through one of its arms 91. As shown in Fig. 7 this lever is eccentrically mounted upon the disk and its arm 91 is provided with an offset terminal 92 which, at one point in the revolution of the disk, engages with the inclined face 93 of a trip 94 which extends upwardly from the partition wall 28. The other arm of this lever is provided with an offset terminal 95 having a lateral extension 96 at its free end which engages against the free end of the terminal 77 of the catch mechanism 53. The free arm of the lever is normally held in engagement with stop pin 97 carried by the disk by means of a helical spring 98 which surrounds the pivot pin 90 and which is secured by one end to the lever and by its opposite end to a pin 99 carried by the disk. As the disk revolves the terminals 92 and 96 of the lever simultaneously engage against the trip 93 and terminal 77 of the catch mechanism respectively and the trip 93 swings the lever against the force of the spring 98 in such a manner that during the engagement of the lever by the trip no motion is transmitted by the lever to the catch mechanism. As soon however as the lever becomes disengaged from the trip the spring 98 throws the lever back to normal position, said movement of the lever acting upon the terminal 77 of the catch mechanism to throw the same into the position shown in full lines in Fig. 7, in which position, the circuit breakers 48, 49 and 50 are open.

Extending transversely of the partition wall 26 is a block 100 formed of vulcanized rubber, or other suitable non-conductive material and extending transversely through this block intermediate its length is a bolt the head of which forms a binding post 101 and the other end of which forms one contact 102 of a switch 103, the other contact of which consists of a leaf spring 104 secured by one end to the block and with its other end normally extending in spaced relation to the contact 102. A second switch 105 is secured to the opposite end of the block 100 and comprises a leaf spring 106 which is secured by one end to the block and which extends in spaced relation to the block, the outward movement of said spring being limited by a pin 107, and an inner contact member consisting of a leaf spring 108 which is secured by one end to the block and which normally engages the free end of the spring 106. The free ends of the contact members 104 and 108 extend past each other, one above the other in such a manner, that while they are never in contact with each other they may both be simultaneously operated by a laterally directed, insulated arm 109 carried upon one end of a switch operating shaft 110 which is rotatably mounted in suitable bearings and the free end of which is provided with a laterally directed extension 111 having a pin engaging terminal 112. As will be seen, a clockwise rotation of the shaft 110 will swing the arm 109 out of engagement with the switch members 104 and 108, thus opening the switch 103 and simultaneously closing the switch 105. This switch operating shaft is normally maintained in the position shown in Fig. 3 of the drawings by a helical spring 113 which surrounds the shaft and which is secured by one end to the bearing of the shaft and by its other end to the extension 111 as shown in Fig. 1. As a means for automatically actuating this switch controlling shaft I have provided the disk 78 with a plurality of spaced sockets 114 which are positioned concentrically with respect to the shaft 79 upon which the disk rotates and which are adapted to receive pins 115. As the disk revolves these pins successively engage the terminal 112 of the switch operating shaft to open and close the switches 103 and 105 as previously described. As will be hereinafter explained the switch 105 controls the signal circuit which consists of a bell or buzzer formed by the electromagnet 54 and its armature 56 and it will therefore be seen that each time one of the pins 115 engages the switch actuating shaft to close the switch 105 the signal will be sounded. By this means any desired signal such as the ring of the station at which the instrument is installed may be sounded by inserting the proper number of pins in the disk in proper position, each pin giving a short ring. In order to provide means for giving a long ring I have connected adjacent pins by a strip of sheet metal 116 which serves to maintain the switch 105 in closed position through a much longer period of time than would a single pin. As will be seen by referring to Fig. 7 of the drawings the pins have been arranged to give a ring consisting of two "longs" and two "shorts" in rapid succession, followed at an interval by a third "short".

Having thus described the principal operating mechanisms of my instrument, together with the switches for controlling their operation I will now describe the wiring of the circuits by means of which the instrument is actuated.

A pair of conductor wires 117 and 118 lead from a switch 119 operated by the receiver arm 120 of the telephone instrument proper, which switch will be hereinafter more fully described, to binding posts 121 and 122 respectively carried by the partition wall 26 of my instrument. Positioned in the lower compartment 28 of my instrument is a battery comprising two cells 123 and 124 which are connected in series by a conductor wire 125. A conductor wire 126 connects the binding post 122 with the spring contact member 104 of the switch 103, a conductor member 127 connects the binding post 101 of the contact member 102 of said switch with one pole of the electromagnet 54 as shown at 128, a conductor wire 129 connects the other pole 130 of said electromagnet with the pole 131 of the cell 124 while a conductor wire 132 connects the binding post 121 with the pole 133 of the cell 123, thus forming a circuit through the battery and magnet which is normally closed by the switch 103 and open at the switch 119 which is operable by the release of the receiver arm 120. As will be hereinafter explained the closing of this circuit closes the circuit breakers 48, 49 and 50.

A conductor wire 134 connects the pole 131 of the cell 124 with the outer member 135 of the circuit breaker 50, while a conductor wire 136 connects the inner member 137 of the circuit breaker 50 with one pole 138 of the motor 83. The circuit through the motor is completed by a conductor wire 139 which connects the other pole 140 of the motor with the pole 133 of the cell 123.

The bell ringing circuit comprises a conductor wire 141 connecting the pole 133 of the cell 123 with the contact member 106 of the switch 105, a conductor wire 142 connecting the contact member 108 of said switch with the frame 46 with which the magnet 54 is electrically connected as shown at 143, and the conductor wire 129 previously described. As will be seen when the switch 105 is closed by the switch closer 109 the current will pass from the cell 123 through the conductor 141, frame 46, electromagnet 54, and conductor 129 back to the cell 124, thereby energizing the magnet to give the signal.

As a means for transmitting the sound of the buzzer to the various stations along the line I have provided the following circuits: A conductor 144 is connected by one end to the pole 133 of the cell 123 and by its other end to the member 145 of the circuit breaker 48, a conductor wire 146 is connected by one end to the other member 147 of the circuit breaker 48 and by its other end to a telephonic transmitter 148, a conductor wire 149 is connected by one end to the transmitter 148 and by its other end to a conductor 150 which connects one terminal 151 of the primary coil 152 with one terminal 153 of the double secondary coil 154 of the induction-coil 155, while a conductor member 156 connects the other terminal 157 of the primary coil with the pole 131 of the cell 124. A conductor wire 158 connects the member 159 of the circuit breaker 49 with the other terminal 160 of the secondary coil, a conductor 161 connects the other member 162 of the circuit breaker 49 with the line wire 40 and a conductor 163 connects the terminals 157 of the primary coil of the induction coil 155 with one binding post of a condenser 164 the other pole of which is connected to the binding post 32 by a conductor 165. It will thus be seen that the primary circuit runs from the battery through the conductor 144, circuit breaker 48, conductor 146, transmitter 148, conductor 149, conductor 150, primary coil 152 and back to the battery through the conductor 156, while the secondary circuit is formed from the line 40, through the conductor 161, circuit breaker 49, conductor 158, secondary coil 154, and then in parallel through the primary winding 152, conductor 150, conductor 149, transmitter 148, conductor 146, circuit breaker 48, conductor 144, cells 123 and 124, conductor 156, condenser 164, conductor 165, cross wire 37 to the ground, through the sub-station, and back to the line 40. By this means any sound produced by the buzzer in my instrument is transmitted to each and every substation of the line and will be clearly heard at any sub-station in use.

Having thus described the construction of my instrument proper, I will now describe the switch 119, which, as previously stated, is secured to the telephone instrument proper and which closes the circuit which sets my instrument in operation. This switch includes a stationary casing which is secured to the instrument and which carries fixed contact points between which the circuit is closed at certain positions of the receiver holding fork arm by a movable contact member carried by the fork arm and slidable in the casing.

In Figs. 8 to 11 inclusive of the drawings, I have illustrated a preferred form of switch in which the casing, which is designated as a whole by the numeral 166, is formed from a single sheet of metal having its side portions bent back in parallel spaced relation to the body to form guides 167 for the movable switch member and then bent at right angles to form sides 168 of the casing, said sides being provided with laterally directed, perforated ears 169 by means of which the casing may be mounted upon the telephone receiver as shown in Fig. 12. The lower end of the casing is closed by means of an integrally formed, inwardly turned tongue 170. The wires 117 and 118 are passed upwardly through this tongue 170 and are electrically connected at their free ends to spring contact members 171 and 172 which are secured by one end to a block 173 mounted in the lower end of the casing and formed of any preferred non-conductive material, said contacts being relieved of any possible strain from the wires 117 and 118 by knotting said wires about a cross bar 174 positioned just within the casing. This casing is provided at its upper ends with a longitudinally extending slot 175 and is so mounted upon the telephone instrument that the receiver holding arm is movable in this slot, the arm being seated in the lower end of the slot when the receiver is on its hook. The movable switch member comprises a body member 176 which is preferably formed from a single piece of sheet metal provided at its upper end with laterally directed tongues which are bent upwardly at right angles to the body member and then inwardly over the same to form a closed upper end 177 and spaced sides 178, the sides being so positioned that the free edges of the body member 176 extend beyond them to engage in the guides 167 as shown at 179. This movable switch member 176 is provided intermediate its length with a transversely extending slot 180 proportioned to receive the receiver arm 120 and to register at its inner end with the slot 175 of the casing when in place. It will therefore be seen that as the receiver arm 120 moves upwardly when the receiver is disengaged, it will carry with it the movable switch member 176. The lower end of this movable switch member is tapered as shown at 181 and terminates in a reduced extension 182 which carries upon its inner face a correspondingly shaped strip of insulating material 183, the free end of said extension and strip being formed to seat in a notch 184 formed in the upper edge of the block 173 when the receiver arm is in lowered position. Extending transversely through this strip 183 and intermediate its length is a contact member 185. This movable switch member is so proportioned that the strip 183 is at all times movable between the spring contacts 171 and 172 to hold their free ends apart. In operation when the receiver is removed from the receiver arm 120 said arm is drawn upwardly by the customary spring, not shown, carrying with it the movable switch member 176. In this upward movement of the movable switch member the contact member 185 momentarily engages between the contacts 171 and 172 to close the circuit through the wires 117 and 118 and then passes above the same to again break the circuit. As will be hereinafter brought out this momentary closing of the circuit caused by the release of the receiver arm 120 sets my instrument in operation.

In employing my improved detector it will of course be understood that each substation of the line will be provided with one of my improved instruments connected in the manner above described, the positioning of the pins 115, and bridges 116 of the disk 78 however, being different in each instrument, said pins and bridges being arranged to give the call number of its particular station.

Assuming that any two stations in the line are in communication with each other and that the receivers of all other stations are upon their respective hooks, my instrument in all non-active stations will be in normal position, as shown in Figs. 12 and 13 and in dotted lines in Fig. 2, the switch 119 in each case being open and all instrument circuits proper being held open by the circuit breakers 48, 49 and 50, the operation will take place as follows: If the receiver 45 of one of the inactive stations is removed from its hook, said hook will move upwardly, carrying its movable switch member with it and the contact 185 carried by this switch member will first close and then open the circuit through the switch 119 of said station. During the momentary period of closing of this switch a current will pass from the battery of my instrument through the conductor 132, 117, the switch 119, the conductor 118, the conductor 126, the switch 104 which is closed, the conductor 127, the electromagnet 54, and back to the battery through the conductor 129 thus energizing the electromagnet 54, this circuit being of course immediately afterward broken by the further upward movement of the movable switch member. The momentary circuit thus set up however energizes the electromagnet 54 which attracts its armature 56 which in turn acts upon the extension 64 of the lever 63 to swing the same against the pressure of the spring 65 to release the trip lever 67. The pressure of the resilient outer contact members of the circuit breakers 48, 49 and 50 against the catch member 53 is then sufficient to swing the catch member to the position shown in Fig. 1 and in dotted lines in Fig. 7, the lever 67 moving to the position shown in Fig. 5, the catch mechanism having been held in operative position through the engagement of the lever 67 by the lever 63. When in the position shown in Fig. 5 the lever 67 holds the lever 63 out of operative position and all circuits through the circuit breakers, 48, 49 and 50 are closed.

A circuit is therefore formed through the transmitter 148, batteries 123 and 124 and the primary winding 152, and another circuit is also formed at the same time from line wire 40 through contacts 49, secondary windings 155 and 154, primary winding 152, condenser 164 to the line 35. Because of the circuits above described, all sound generated by the buzzer of the instrument under discussion will be transmitted to all telephone instruments proper which are in operation, and will be plainly audible at such substations. In the meantime, a circuit is closed through the circuit breaker 50 between the battery and the motor 83, starting the motor which, through the intercession of the gears 84 drives the disk 78 in a counter-clock-wise direction. As this disk revolves, its pins 115 and bridges 116 successively engage the terminal 112 of the switch operating shaft 110 causing the same at each engagement to open the switch 103 and close the switch 105. When the switch 105 is closed, a current is established from the battery through the conductor 141, switch 105, electromagnet 54 which acts with its armature as a buzzer, conductor 129 and back to the battery. It will therefore be seen that each time a pin or bridge of the disk is engaged by the terminal of the switch operating shaft the buzzer will be energized and the signal given will be transmitted through the induction coil circuits previously described to the substations which are in communication, thus giving notice that another station has broken in on the line. As previously stated the pins and bridges are so arranged upon the disk as to give the call number of the substation which has cut in on the line. Because of this parties legitimately using the line can readily determine which substation has cut in upon them. As will be seen after the circuits through the circuit breakers 48, 49 and 50 have once been closed by the momentary closing of the switch 119, all subsequent opening and closing of the switch 19 previous to the completion of the signals will be without effect.

In Fig. 1 of the drawings I have shown my instrument in operation, the first of the pins 115 being about to engage with and swing the arm 111 of the switch operating shaft 110 to momentarily close the buzzer circuit. The disk revolves in a counter-clock-wise direction and said arm is therefore successively engaged by the two bridges 116 to give two long rings and immediately afterward by two pins 115 to give two short rings after which there is a break followed by another short ring. As the disk continues to revolve the arm 92 of the lever passes beneath the terminal 77 of the catch mechanism and engages against the trip 93 while the terminal 96 of the lever 89 engages against the terminal 77 of the catch mechanism. As previously described the trip 93 swings the lever against the force of the spring 98 in such a manner that during the engagement of the lever by the trip no motion is transmitted by the lever to the catch mechanism. As soon however as the lever becomes disengaged from the trip the spring 98 throws the lever back to normal position, said movement of the lever throwing the catch mechanism into the position shown in full lines in Fig. 7. As there shown the terminal 96 of the lever is still in engagement with the terminal 77 of the catch mechanism. When in this position all circuits through the circuit breakers 48, 49 and 50 are open through the opening of the circuit breakers and the motor by which the disk is driven will therefore stop. Its inertia, however is sufficient to revolve the disk to disengage the terminal 96 of the lever 89 from the terminal 77 of the catch mechanism. As above stated and as shown in Fig. 7 the action of the lever 89 upon the catch mechanism tilts the latter to open the circuit breakers 48, 49 and 50. This tilting action of the catch mechanism forces the outer end of the trip lever 67 downwardly thereby raising the inner end of the lever and permitting the spring 65 to force the extension 66 of the lever 63 forward to the position shown in Fig. 4 thus locking the catch mechanism 53 in place. The parts of the instrument have now returned to normal position. Upon the replacing of the receiver upon its hook the circuit through the switch 119 is again closed and broken, again setting my instrument in operation, the action of the parts being identical with that previously described, the instrument again giving the call number of the sub-station cutting in. By this means it is possible for one to know when the offending substation has hung up and therefore when the line is again clear.

As the signal given depends in each case wholly upon the instrument at the particular substation it will be apparent that notice will be as effectively given in cases of successive cutting in of various substations as in the case of a single substation previously described.

From the foregoing description it will be apparent that I have provided a simple and efficient instrument for giving warning of the cutting in of a third party upon a party line when the line is in operation and one which is so constructed that it cannot be disconnected from the telephone proper without rendering the telephone from which it is disconnected, inoperative. It will further be apparent that I have so constructed my instrument that it is put in operation by the momentary closing of a single switch operated by the receiver holding fork of the telephone instrument proper and that after having once been set in motion its action is entirely separate from and independent of further movements of the receiver fork. It will further be apparent that my instrument is adapted to give the usual party ring of the instrument cutting in, the detection of the offending substation therefore not depending upon the ringing of a bell of particular tone, which may be readily mistaken, but upon a clear, well defined and well known signal.

It will of course be understood that I do not wish in any way to limit myself to the specific construction of the detail parts herein described and illustrated, as the circuits may be differently wired, the circuit breakers and switches differently constructed, or the signaling device proper altered, without in the slightest degree departing from the broad spirit of my invention as hereinafter set forth in the claims.

What I claim is:—

1. An attachment for a party line telephone comprising an open circuit, means operable by the receiver arm for momentarily closing said circuit, a plurality of circuit breakers, means operable by the closing of said circuit for closing said circuit breakers, a sounding circuit normally open at one of said circuit breakers, a switch in said sounding circuit, controlling mechanism for said switch, an actuating circuit for governing said controlling mechanism normally open through another of said circuit breakers, a sound transmitting circuit normally open through another of said circuit breakers, and means operable by the switch controlling mechanism for opening said circuit breakers.

2. An attachment for a party line telephone comprising a sound transmitting circuit, a buzzer, a buzzer circuit, a switch in said buzzer circuit, means for automatically actuating said switch, a circuit for operating said actuating means, a circuit breaker in each of said circuits, and means operable by the movement of the receiver arm of the telephone for simultaneously closing said circuit breakers.

3. An attachment for a party line telephone, comprising a buzzer and its circuit, a transmitter and its circuit, a switch in said buzzer circuit, means for actuating said switch, an actuating circuit for said actuating means, circuit breakers in said buzzer circuit, transmitter circuit and actuating circuit, and electrically operated means for closing said circuit breakers.

4. An attachment for a party line telephone, comprising an open circuit, means operable by the receiver arm for momentarily closing said circuit, a plurality of circuit breakers, circuits through said circuit breakers for sounding a signal and transmitting the same to the line, and means operable by one of said latter circuits for opening the circuit breakers when the signal has been given.

5. An attachment for a party line telephone, comprising an open circuit, means operable by the receiver arm for closing said circuit, a plurality of circuit breakers, means operable by the closing of said circuit for closing said circuit breakers, a sound transmitting circuit through one of said circuit breakers, another circuit through another of said circuit breakers, a buzzer and a switch in said latter circuit, another circuit through the other of said circuit closers, a motor in said last named circuit, a rotatable disk, means operated by the motor for rotating said disk, a switch actuating device for opening and closing the buzzer circuit, means carried by the disk for actuating said switch actuating device, and means operable by the rotation of the disk for opening said circuit closers.

6. An attachment for a party line telephone, comprising a plurality of circuit breakers, means operable by the receiver arm for closing said circuit breakers, a sound transmitting circuit through one of said circuit breakers, a buzzer circuit through another of said circuit breakers, a revoluble disk, means for revolving said disk, a plurality of pins carried by said disk, bridges carried by said disk, a switch in said buzzer circuit, switch operating means for said switch including an arm adapted to be engaged by the pins and bridges of the disk, and means operable by the disk for opening said circuit breakers.

7. An attachment for a party line telephone, comprising a plurality of circuit breakers normally open, a normally open circuit, a switch operable by the receiver arm for closing said circuit, an electromagnet in said circuit, an armature for said magnet, a catch mechanism for normally holding the circuits in open position, means operable by the movement of the armature for releasing said catch mechanism to close the circuit breakers, a sounding circuit through one of said circuit breakers, a transmitting circuit through another of said circuit breakers, a motive circuit through the other of said circuit breakers, and means operable by said latter circuit for opening said circuit breaker.

8. An attachment for a party telephone, comprising a plurality of circuit breakers normally open, circuits through said circuit breakers, means operable by said circuits for sounding a signal and transmitting the same to the telephone line, a catch for normally holding said circuit breakers in open position, a trip mechanism for releasing said catch, an electromagnet for actuating said trip mechanism, an open circuit through said magnet, means operable by the receiver arm for closing said circuit, and means for returning the catch mechanism to normal position.

9. An attachment for a party line telephone, comprising a plurality of circuit breakers, a catch mechanism for normally holding said circuit breakers in open position, means for releasing said catch mechanism, a sounding circuit through one of said circuit breakers, a sound transmitting circuit through another of said circuit breakers, a switch in said sounding circuit, a disk, means for rotating said disk, means actuated by said rotating disk for opening and closing said switch, and means carried by said disk for returning said catch mechanism to normal position.

In testimony whereof, I affix my signature, in presence of two witnesses.

JOHN W. NILSSON.

Witnesses:
G. J. WICK,
OTTO J. WICK.

---

Copies of this patent may be obtained for five cents each, by addressing the "Commissioner of Patents, Washington, D. C."